United States Patent [19]

Stanaitis

[11] 4,157,725
[45] Jun. 12, 1979

[54] FASTENER AND CAPTIVE FRUSTO-CONICAL WASHER ASSEMBLY

[75] Inventor: Peter P. Stanaitis, Rockford, Ill.

[73] Assignee: Textron Inc., Providence, R.I.

[21] Appl. No.: 837,907

[22] Filed: Sep. 29, 1977

[51] Int. Cl.² ............................................ F16B 39/24
[52] U.S. Cl. .................................... 151/37; 85/50 R; 339/263 R
[58] Field of Search ........................... 151/37, 38, 35; 85/50 R, 62; 10/155 R; 339/95 R, 246, 263 R

[56] References Cited

U.S. PATENT DOCUMENTS

| | | | |
|---|---|---|---|
| 916,421 | 3/1909 | Crittenden | 151/38 UX |
| 1,057,686 | 4/1913 | Thomson et al. | 151/38 |
| 2,412,120 | 12/1946 | Bouchard | 85/50 R |
| 2,709,470 | 5/1955 | Knohl | 151/37 |
| 3,777,796 | 12/1973 | Takano | 151/38 |
| 3,960,048 | 6/1976 | Wagner | 151/38 X |
| 3,967,875 | 7/1976 | Stanaitis | 151/37 X |

Primary Examiner—Roy D. Frazier
Assistant Examiner—William E. Lyddane
Attorney, Agent, or Firm—Trexler, Wolters, Bushnell & Fosse, Ltd.

[57] ABSTRACT

There is disclosed a fastener assembly including a fastener or screw member having a head portion and an externally threaded body portion, and an improved novel washer design pre-assembled thereon and held in captive relation by the external thread form. The washer member comprises a frusto-conical body section which includes surfaces converging in a direction away from the fastener drive head, in contrast to the normal accepted practice of employing washer which surfaces converge toward the drive head. From this reversal of design numerous manufacturing and operational advantages result, most particularly when the washer includes a plurality of axially extending teeth disposed radially about the convex face thereof. When the assembly is engaged with a nut or a workpiece to clamp or join structural elements, the fastener head portion will bear directly over the teeth of the washer member urging them into biting engagement with the adjacent surface regardless of the degree of final assembly. Also, the reversed frusto-conical design permits the thread portion to be formed more closely to the head portion than could be attained with the prior art designs.

8 Claims, 8 Drawing Figures

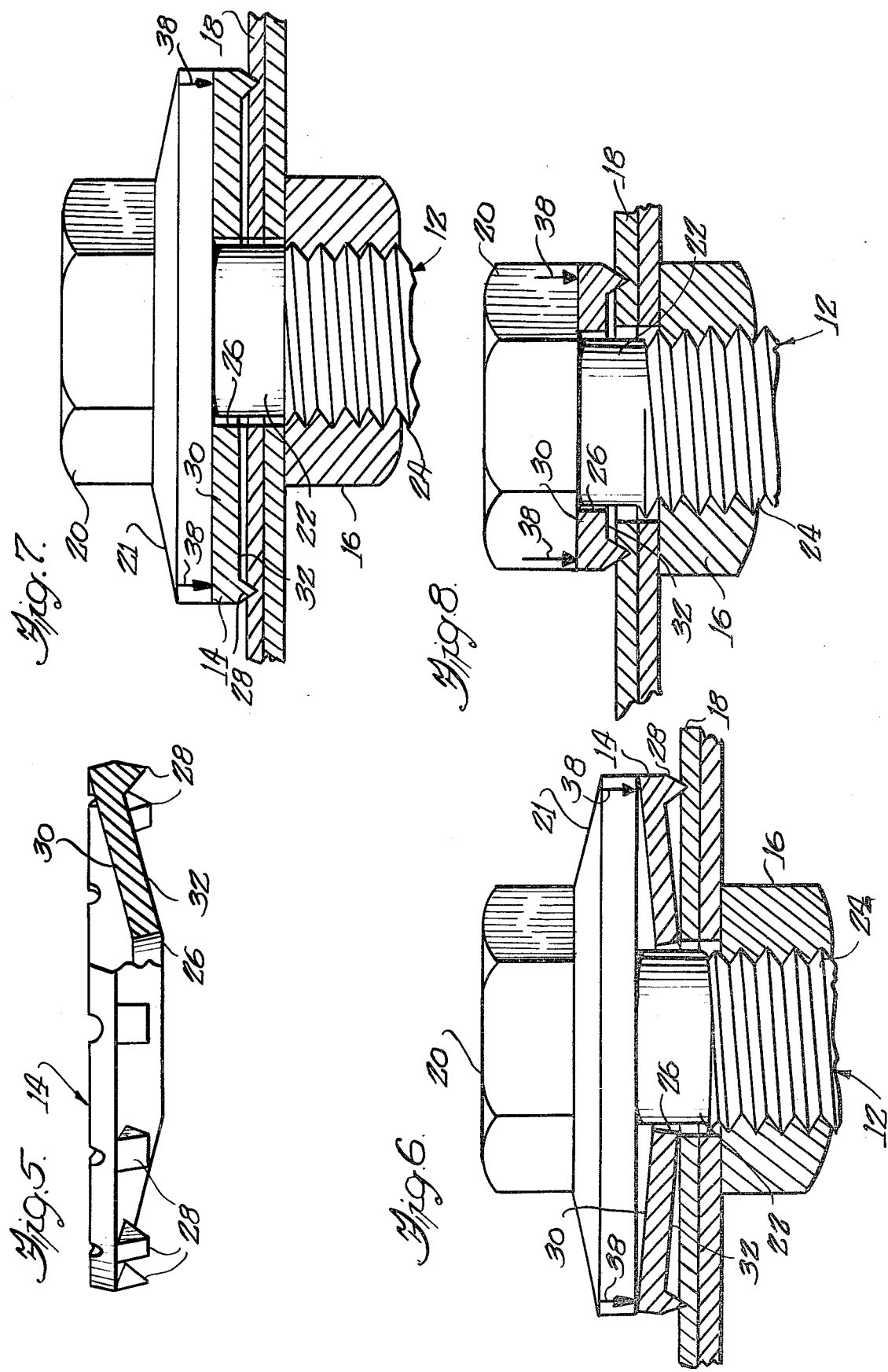

FASTENER AND CAPTIVE FRUSTO-CONICAL WASHER ASSEMBLY

BACKGROUND OF THE INVENTION

This invention relates to a fastener assembly of the type employing a pre-assembled screw fastener and washer member. More specifically, said invention concerns a frusto-conical washer which converges in a direction away from the fastener drive head rather than toward said head, as is the common accepted practice.

Before discussing the present invention in detail, a brief review of the prior art will be beneficial, since upon recognition of the structural features and deficiencies of the prior art, the present invention will be placed in perspective and more fully appreciated. In this regard, pre-assembled fastener assemblies including a washer captively assembled to a screw threaded member, have long been known and used in the art, and are termed generally "sems". Many users, in particular the automobile industry, require such pre-assembled fasteners in numerous installations or joints that must be effected in the manufacture of their products. Specifically, fastener units employing a frusto-conical washer are useful in maintaining a tight joint as they must be compressed upon assembly and maintain an axial force on the screw member to prevent loosening. Also, the washer may include teeth to establish good electrical contact through the engagement of the washer teeth with the workpiece or structural elements clamped with the fastener.

Generally speaking, in the manufacture of preassembled fasteners of the described type, an unthreaded, headed blank is provided and an apertured, frusto-conical washer member is positioned thereon adjacent the head portion. In these prior art designs, the concave and convex surfaces of the washer extend or converge in a general direction toward the fastener head (See FIG. 1). After this initial assembly, the fastener blank is subjected to a thread forming process, such as cold rolling wherein a screw thread is formed on the body portion thereof. This type of threading procedure produces an upsetting of the material and a reworking thereof to produce a desired thread form, as distinguished from a machining operation wherein material is removed from the blank to provide the thread form. In the cold rolling of the thread, the major dimension or crest diameter of the resulting thread form produced is greater than the original cross-sectional dimension of the unthreaded blank, while the minor thread dimension or root diameter is less than the original cross-sectional dimension. Accordingly, by sizing the washer aperture so that it will freely pass over the unthreaded blank and subsequently forming a thread as discussed above, the resulting major thread diameter will be greater than the aperture of the washer and thus serve to maintain the washer in assembled relation on the screw shank.

It must be kept in mind that the above discussed thread forming takes place with the washer assembled on the shank, adjacent the head portion of the screw member. Therefore, where a frusto-conical washer is employed, the external thread thus formed can only extend along the shank to a location coincident with the plane defined by the outer peripheral edge or rim of the washer when it is engaged against the drive head. That is to say, the total axial dimension of the frusto-conical washer defines the limit of the extent of engagement of the thread rolling dies along the shank of the screw member. Thus a substantial unthreaded shank portion remains, which is of a diameter between the root and crest diameter of the thread.

The unthreaded shank portion presents a problem in the clamping of relatively thin structural elements. More specifically, the fastener can be engaged with a nut or workpiece only to the extent of the threaded portion thereof, as the mating female threads of said nut or workpiece cannot pass over the unthreaded section. Thus, where thin structural elements are to be clamped, the fastener may bottom before the desired clamping force is attained. While this problem can be overcome by use of flat washers, the advantages of the resulting, flexible frusto-conical or belleville type washer is sacrificed.

As an additional matter, at numerous installations in an automobile for example, the fastener units of the type discussed above are utilized to clamp one or more workpieces, and additionally to provide electrical contact via engagement of the washer teeth with the surface of the workpiece. This is especially important where an electrical ground is achieved by contact with the frame and/or sheet metal of an automobile. It will be appreciated, then, that such grounding necessitates a firm engagement and often a slight biting into the surface of the work piece by the washer teeth, as the workpiece may be covered with a thin film of oxide or the like which would otherwise prevent the desired grounding contact. The residual forces necessary to such engagement are obtained primarily, in the prior art fasteners, only upon complete deflection of the washer to a generally flat position, since it is only when this is achieved that the fastener head will bear against the washer proximate the washer teeth. Therefore, should only partial deflection be obtained, the desired ground contact may not be achieved.

One prior art solution to the above problem concerning the clamping of thin material has been to form the thread prior to assembling the washer with the screw member, thus forming the thread closer to the head of the screw member. However, this requires that the washer member be provided with an aperture large enough to be engaged over the external thread form, whereby the material of the washer must be subsequently deformed or staked to reduce the effective aperture dimension below that of the external thread form, to retain the washer captive on the screw member. Another solution to this problem is as disclosed in U.S. Pat. No. 3,913,649, wherein the shank includes a recluse section to permit thread run out. The solution, however, gives rise to additional problems in that they require additional assembly and thus additional expense.

The present invention solves many of the foregoing problems inherent in the prior art, and does so while retaining both ease of manufacture, relatively low cost and dependability.

Keeping in mind the above discussion, the present invention provides a fastener assembly wherein a frusto-conical washer is pre-assembled with a screw member prior to thread rolling. The washer may include teeth, or some other form of engagement means, or it may be smooth. Further, the frusto-conical form of the washer is reversed with respect to the conventional design, in that it converges away from the drive head rather than toward said drive head. Surprisingly, this design change produces some rather unexpected, synergistic results. Where the washer is of a larger diameter than the drive head, it can be moved closer to the head with the drive head received within the concave portion and the rim extending away from the shank. Thus, thread rolling can extend to a location proximate the drive head. In the embodiment wherein the washer includes teeth, and the washer and drive head are of approximately equal diameter, the overall axial dimension of the washer with respect to the screw body is decreased from the prior art arrangement by the height of the teeth, allowing the shank to be threaded somewhat closer to the head portion. Further, with this design, the head portion bears directly over the teeth of the washer member at all times during assembly, thus encouraging the desired biting engagement of the teeth with the workpiece even though the washer is not compressed totally.

The foregoing, as well as other features and advantages of the present invention will be more fully realized upon consideration of the following detailed description, together with the accompanying drawings, wherein like reference numerals throughout designate like elements and components.

BRIEF DESCRIPTION OF THE DRAWINGS

FIG. 5 is an elevational view, partially in section of a frusto-conical toothed washer in accordance with this invention;

FIGS. 6 and 7 are elevational views, partially in section, illustration respectively the fastener assembly of FIG. 3 at an intermediate condition and with the washer fully compressed or deflected.

FIG. 8 illustrates the fastener assembly of FIG. 4 fully seated.

DETAILED DESCRIPTION OF THE ILLUSTRATED EMBODIMENT

Figure 1:
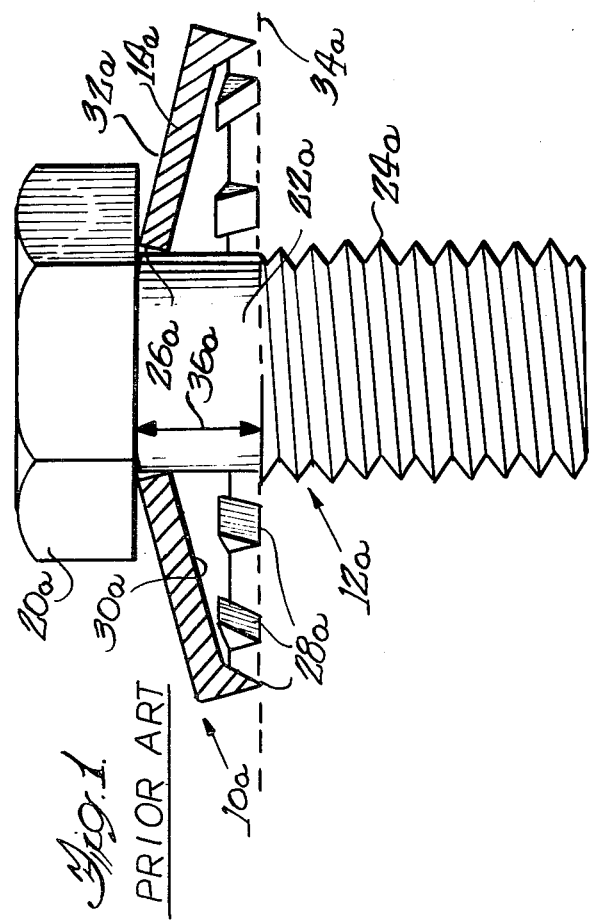
FIG. 1 is an elevational view of the prior art type of fastener assembly, with the frusto-conical washer shown in section.

Turning now to the drawings, FIG. 1 illustrates a prior art type of fastener assembly of the general type subject to the above discussed disadvantages. In describing the structural features of the prior art fastener of FIG. 1, the reference characters employed will be designated by the suffix a, which suffix will be omitted in the subsequent reference to the structural components of the fastener assembly designs of the present invention. Further, while a nut is illustrated in the drawings and referred to hereinafter, it is to be understood that the fastener may also be engaged with an internally threaded workpiece, or alternatively, the thread form on said fastener may be of the self-tapping variety, without departing from the principals of the invention.

Turning to FIG. 1, there is shown a fastener assembly 10a which comprises, generally, a screw member 12a having a captive frusto-conical toothed washer 14a thereon. The screw member 12a is of a generally standard configuration, including a driving head 20a, an unthreaded shank portion 22a and a threaded shank portion 24a. The screw member is initially formed from a blank having an unthreaded shank of generally constant diameter equal to that of the unthreaded shank section 22a. After the washer 14a is positioned over the unthreaded blank, the blank is cold worked to produce the thread form 24a having a major dimension or crest diameter greater than the original diameter of the blank and a minimum thread form or root diameter less than the diameter of the unthreaded blank. The size of the aperture 26a of the washer 14a is controlled, such that the washer can be positioned over the unthreaded blank, but will be held in captive relation thereon subsequent to formation of the thread form 24a.

The washer 14a is frusto-conical in shape, and includes a plurality of teeth 28a depending downwardly from the radially outer rim of the concave surface 30a thereof and extending generally in the direction of the thread 24a. The convex surface 32a of the washer 14a faces the head 20a of the screw member 12a. It will be appreciated from the foregoing, that upon rolling it is not possible to extend the thread form 24a beyond the plane defined by the datum line 34a, leaving a substantially unthreaded shank portion 22a. Thus, the unthreaded shank portion 22a is of a length, as indicated by the arrow 36a, which generally corresponds to the axial height of the frusto-conical washer 14a including the teeth 28a.

It will be appreciated that if the fastener assembly 12a is employed in conjunction with a relatively thin structural element or workpiece, that if the thickness of said element or workpiece is less than the dimension 36a, the washer 32a will not be compressed. Consequently, the desired locking between fastener and joint and biting engagement of the teeth 28a with the workpiece 28a may become lost in service. Moreover, it will be noted that the head 20a bears against the convex surface 32a of the washer 14a substantially about the aperture 26a. Therefrom upon assembly of the fastener 12a no force is brought directly to bear over the teeth 28a to aid in effecting the desired biting engagement thereof with the surface of the structural elements to be clamped or the workpiece.

Attention is now directed to FIGS. 2 through 8, wherein fastener assemblies designed in accordance with the present invention are illustrated. Considering first FIG. 2, the fastener unit or assembly 10 of this embodiment includes a screw member 12 having a driving head 20, a threaded body portion 24 and a non-threaded shank portion 22 disposed intermediate the driving head and threaded portion. A frusto-conical toothed washed 14 is carried on the screw member 12 proximate the unthreaded shank portion 22. As in the prior art construction discussed above, the diameter of the aperture 26 in the washer 14 is less than the major diameter of the thread form 24, so that captive relation is attained.

It will be noted that the washer 14 is generally frusto-conical in shape and includes a plurality of teeth 28 depending downwardly from the outer periphery of the convex surface 32 thereof, and extending generally in the direction of the thread 24. In contrast to the prior art arrangement of FIG. 1, the concave and convex surfaces 30 and 32 converge in a direction away from the drive head 20, and concave surface 30 faces the head 20 of the screw member 12.

Figure 2:
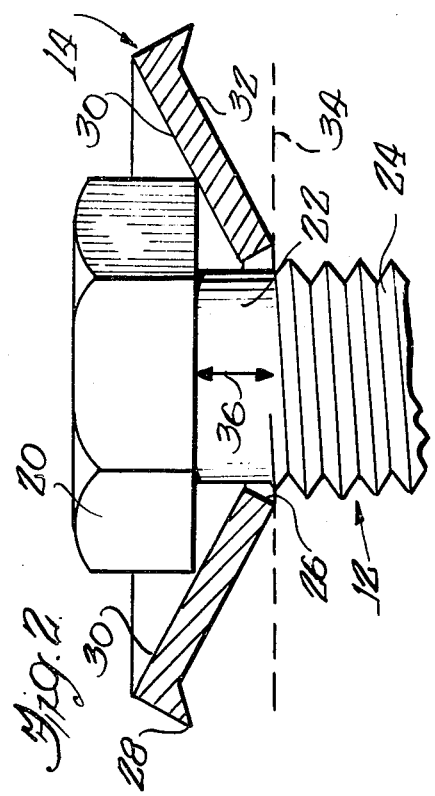
FIG. 2 is an elevational view, partially in section of an embodiment of the present invention.

Consequently, during manufacture and preparatory to thread rolling, the washer 14 may be disposed on the shank and moved toward the drive head 20, with said head 20 in effect being received within the space provided by the concave surface 30. This permits the washer 14 to be disposed closer to the drive head 20. In addition, the outer peripheral edge of washer 14 is disposed remote from the threaded portion 24 with the edge of aperture 26 provided by concave surface 32 defining the datum line 34, which represents the limit of engagement of the shank by the thread forming dies. Thus the length 34 of the unthreaded section 22 is reduced. Accordingly, the embodiment of FIG. 2 is adapted to accommodate thinner structural elements or workpiece, than is the assembly 10a of FIG. 1.

Figure 4:
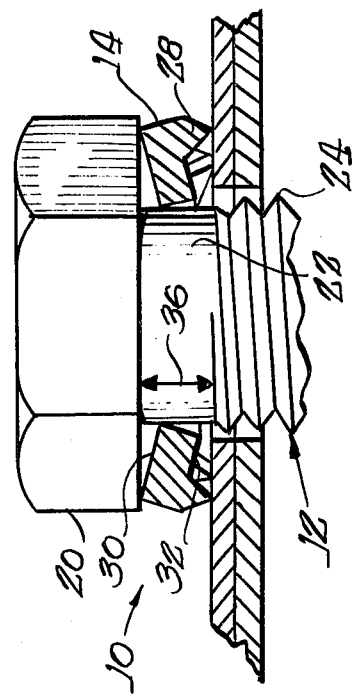
FIG. 4 is an elevational view, partially in section, of an alternate embodiment of a fastener assembly according to the invention.
Figure 3:
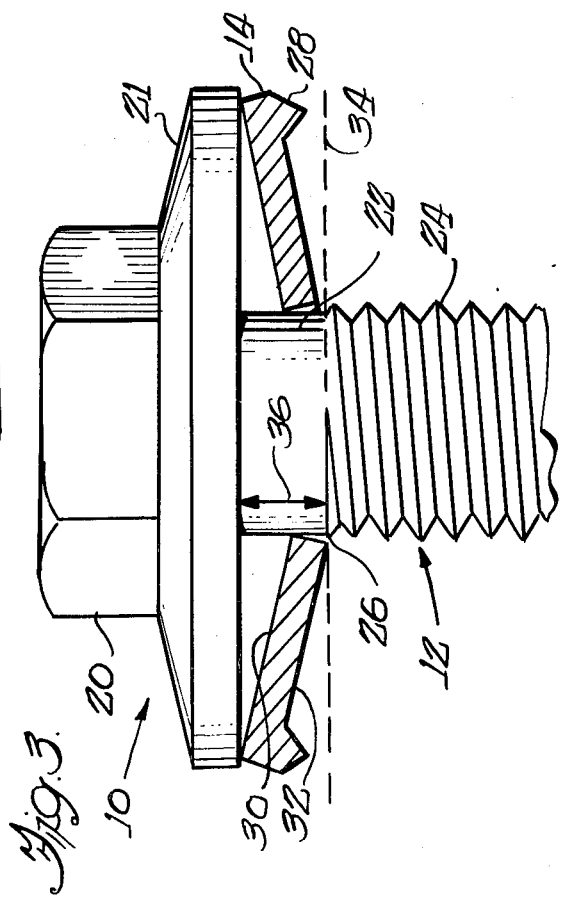
FIG. 3 is an elevational view, partially in section, of a fastener assembly according to the present invention designed to attain effective biting engagement.

With reference to FIG. 3, it should be noted that in the embodiment of FIG. 3, the head 20 includes an enlarged diameter, outwardly extending flange or skirt portion 21, adjacent the washer 14, the flange 21 being of somewhat greater diameter than the frusto-conical washer 14. In the embodiment of FIG. 4, however, the washer 14 is of similar diameter to the head 20. While the embodiments do not permit the reduction in the length 36 of the unthreaded section 22 achieved with the design of FIG. 2, the teeth 28 do not add to the axial extent of the washer 14, in contrast to the configuration of the teeth 28a of the washer 14a in FIG. 1. Thus, by comparison the length of the unthreaded section 36 of this embodiment is reduced over that of the FIG. 1 embodiment by substantially the axial length of the teeth 28. As will be detailed however, certain other advantages are attained.

A preferred form of frusto-conical washer 14 is illustrated in some detail in FIG. 5. It will be appreciated that the washer 14 of FIGS. 4 and 8 is substantially identical with the washer 14 of FIG. 5, but is of similar outer diameter, to generally correspond with the diameter of the head 20 of the fastener of the embodiments of FIGS. 4 and 8. The larger diameter head flange portion 21 is provided in the embodiment of FIGS. 3, 6 and 7 to compliment a larger diameter washer 14.

Attention is directed now to FIGS. 6, 7 and 8 wherein completed or partially completed joint structure effected with fastener assemblies 10 according to this invention are illustrated. In this regard, said figure illustrates a nut 16 engaged with the external thread form 24, whereby the screw member 12 is advanced therethrough, with structural elements or pieces 18 being clamped between the nut 16 and driving head 20, the washer 14 being disposed between the head and the workpiece. It should be noted that the nut 16 is representative also of an apertured, internally threaded workpiece, or an apertured work piece that is having an internal thread formed therein by that of the fastener. It will be noted that FIGS. 7 and 8 illustrate the fastener assembly 10 advanced substantially fully into the nut or workpiece 16, whereas FIG. 6 illustrates the fastener assembly 10 advanced to a somewhat lesser extent with respect to the nut or workpiece 16. In accordance with a feature of this invention, and as will be more fully described hereinbelow, the degree of advancement of the fastener assembly 10 illustrated in FIG. 6 is effective to achieve the desired degree of clamping of the structural elements 18 and biting engagement of the teeth 28 with the surface of the elements 18.

In the assembly of the joints in FIGS. 7 and 8, as the screw member 12 is advanced along its thread 24 through the internally threaded workpiece or nut 16, the washer 14 will first contact the structural elements 18 substantially about the aperture 26 thereof and begin to compress. As the screw member 12 is further advanced, the teeth 28 of the washer 14 will engage the surface of the element 18, and continue to be forced thereagainst in biting engagement by the head 20, in FIG. 8, and the flange portion 21 of the head 20 in FIGS. 6 and 7, which flange portion 21 bears over the teeth 28 as indicated by the arrows 38. Thus, continued tightening or advancement of the screw member 12 will produce the desired deflection or compression of the washer 14 as well as forcing the teeth 28 into the desired biting engagement with the surface of the structural element 18.

With the situation as illustrated in FIG. 6, it can be appreciated that even though the fastener 12 is not fully seated, the teeth 28 have already effected biting engagement with the surface of the structural element 18. By comparison, with the prior art assembly 10a of FIG. 1, biting engagement will not be obtained until the washer 14a is fully deflected. The improved biting engagement attained with the present invention is due primarily to the reverse frusto-conical design and the resulting bearing of the flange 21 of the head 20 against the washer 14 directly above the teeth 28 at all times during seating of the fastener 12.

Thus, with the above in mind, Applicant believes that it has demonstrated that by altering the frusto-conical configuration in opposition to the conventional practice, that numerous important unexpected and synergistic operational and manufacturing advantages are obtained. While preferred embodiments of the present invention have been illustrated and described herein, those skilled in the art may devise various changes, alterations or substitutions, without departing from the spirit and scope of the invention, as defined by the appended claims.

The invention is claimed as follows:

1. A fastener assembly for engagement in an apertured workpiece or the like, said assembly including a screw member having an enlarged head portion and a shank, said shank including an externally threaded portion and an unthreaded portion disposed between said head portion and said threaded portion, and an apertured, flexible washer member held captive on said shank in the area of said unthreaded portion by said external thread which is cold rolled to a major diameter greater than that of the aperture in said washer member, said washer member being constructed from a relatively flexible material so that it will flex under anticipated, design loading to a generally planar orientation, said washer including a central aperture through which said unthreaded portion is received, and in the unstress condition, said washer is further defined by generally parallel upper and lower frusto-conical surface portions, with the respective portions diverging in a direction away from said central aperture toward said enlarged head portion, the radially inner edges of said frusto-conical surface portions serving to define partially said central aperture, with the radially outer terminus of said surface portions defining the outer peripheral edge of said washer, with said outer peripheral edge, due to the frusto-conical nature of said surface portions, being disposed at a level above said threaded portion, such that said thread may be cold rolled on said shank in close proximity to said central aperture, without the outer peripheral edge of said washer interferring with said cold rolling of the thread.

2. A fastener assembly according to claim 1 wherein said driving head portion includes a tool engaging segment and a flanged segment of larger diameter, said flanged segment overlying said outer peripheral edge of said washer.

3. A fastener assembly according to claim 1 wherein said driving head portion is of a diameter sufficient to permit it to overlie the outer peripheral edge of said washer, and said inner portion including a plurality of circumferentially spaced teeth extending substantially in the direction of said threaded portion, with said driving head portion bearing against said washer above said teeth.

4. A fastener assembly according to claim 3 wherein said driving head portion includes a tool engaging segment and a flanged segment of larger diameter, said flanged segment overlying said outer peripheral edge of said washer.

5. A fastener assembly for engagement in an apertured workpiece or the like, said assembly including a screw member having an enlarged head portion and a shank, said shank including an externally threaded portion and an unthreaded portion disposed between said enlarged head portion and said externally threaded portion, and an apertured, flexible washer member held captive on said shank in the area of said unthreaded portion by the external thread formed on said threaded portion, which thread is cold rolled to a major diameter greater than the diameter of said aperture in said washer member, said washer member being constructed of a relatively flexible material such that under anticipated loading, it can flex resiliently to a generally planar orientation, said washer member including a central aperture through which said unthreaded shank portion is received, and in the unstressed condition, said washer member being defined by a generally frusto-conical section, the frusto-conical section diverging away from the central aperture toward said enlarged head portion, the frustum portion thereof being defined by said central aperture, with said frusto-conical section terminating in a generally circular outer edge, which defines the peripheral edge of said washer, said peripheral edge being disposed at a level above said threaded portion so that said thread can be rolled in close proximity to said central aperture, said washer member further including a plurality of generally axially extending teeth formed proximate said outer peripheral edge, said teeth extending away from said enlarged head portion, and said enlarged head portion having an effective diameter to overlie said teeth, such that upon seating of said fastener assembly with respect to a workpiece to a predetermined tension, said washer member will be resiliently flexed to a substantially planar orientation with said driving head portion bearing on said washer above said teeth to force said teeth into biting engagement with said workpiece.

6. A fastener assembly according to claim 5 wherein said driving head portion includes a tool engaging segment and a flanged segment of larger diameter, said flanged segment overlying said outer peripheral edge of said washer.

7. A structural joint comprising in combination an externally threaded fastener assembly including a fastener element and a compressible, frusto-conical washer member held captive thereon, and an apertured workpiece structure for engagement with said fastener assembly, said fastener element comprising a screw member having a head portion and an elongate shank, said shank including an externally threaded portion remote from said head portion and an unthreaded portion disposed intermediate said head portion and said threaded portion, said compressible washer member including a central aperture and being carried on said screw member proximate the unthreaded portion, said washer member being constructed of a relatively flexible material, and in the unstressed condition being defined by a generally frusto-conical section, the frusto-conical section diverging away from the central aperture toward said head portion, the frustom portion of which is provided by said central aperture with said frusto-conical section terminating in an edge which defines the outer peripheral edge of the washer, which edge is disposed at a level above said threaded portion so that said thread can be rolled in close proximity to said central aperture, said washer member further including a plurality of generally axially extending teeth formed proximate said peripheral edge, which teeth extend away from said head portion, and said head portion having an effective diameter to overlie the peripheral edge of said washer and correspondingly said teeth, such that upon seating of said fastener assembly to a predetermined tension, said washer will be resiliently flexed to a substantially planar orientation, with said head portion bearing on said washer above said teeth to force said teeth into biting engagement with the workpiece structure.

8. A joint as defined in claim 7 wherein said head portion comprises a driver head and a flanged skirt segment of a larger cross-sectional dimension similar to the outer diameter of said washer element, whereby said flanged skirt segment bears directly over said teeth for encouraging said biting engagement thereof.

* * * * *